United States Patent [19]

Bohmer et al.

[11] Patent Number: 5,348,813

[45] Date of Patent: * Sep. 20, 1994

[54] BATTERY CHARGE INDICATOR

[75] Inventors: William Bohmer, Succasunna; Clark F. Bow, Newton, both of N.J.

[73] Assignee: Display Matrix Corporation, Randolph, N.J.

[ * ] Notice: The portion of the term of this patent subsequent to Sep. 14, 2010 has been disclaimed.

[21] Appl. No.: 760,200

[22] Filed: Sep. 16, 1991

Related U.S. Application Data

[63] Continuation-in-part of Ser. No. 709,859, Jun. 4, 1991, Pat. No. 5,244,754.

[51] Int. Cl.⁵ ............................................. H01M 10/48
[52] U.S. Cl. .......................................... 429/91; 429/66
[58] Field of Search .............................. 429/66, 90, 91; 73/37.5, 37.9

[56] References Cited

U.S. PATENT DOCUMENTS

| | | | |
|---|---|---|---|
| 2,846,871 | 8/1958 | Worthen | 73/37.9 X |
| 3,218,858 | 11/1965 | Van Woert | 429/91 X |
| 3,563,806 | 2/1971 | Hruden | 429/91 X |
| 4,129,686 | 12/1978 | Kaduboski | 429/66 X |
| 4,992,344 | 2/1991 | Coppers | 429/66 X |

Primary Examiner—Stephen Kalafut
Attorney, Agent, or Firm—John Q. McQuillan

[57] ABSTRACT

A battery charge indicator is permanently incorporated into a battery to indicate the state of charge. In one embodiment, the indicator includes a compressible chamber which is filled with a viscous gel and which is exposed to the expandable cathode of the battery. As the battery discharges, the cathode expands thus causing the gel within the chamber to be extruded out through an outlet into a viewing channel in an overlying disk. The amount of gel flowing into the viewing channel is proportional to the amount of expansion of the cathode and, thus, indicates the amount of discharge and, conversely, the remaining life of the battery. In a second embodiment, a piston assembly is caused to move with a deformable end wall of the battery and indicia on the side wall of the piston assembly is viewed through a lens as a measure of the remaining amount of expect expansion of the cathode.

16 Claims, 14 Drawing Sheets

BATTERY CHARGE INDICATOR

This application is a continuation-in-part of Ser. No. 07/709,859, filed Jun. 4, 1991, now U.S. Pat. No. 5,244,754.

BACKGROUND OF THE INVENTION

This invention relates to a battery charge indicator. More particularly, this invention relates to a battery having a battery charge indicator therein.

In order to measure the state of charge of primary batteries, it is usually necessary to measure the current or voltage of the battery under test. The testing of current and voltage is usually performed with external test equipment, such as voltmeters and battery testers. The cost of the associated test equipment or testers varies widely. There are expensive digital multimeters that will measure both voltage and current as well as inexpensive units that utilize simple resistor calibrated galvometers. There is also a heat sensing material that changes color when the material is heated up by an electrical conductor that is placed across the battery terminals. In all cases of primary battery state of charge detection, it has been necessary to place the battery either in or near the tester and then activate the test. In some units, the placing of the battery in the tester itself causes contact to be made which initiates the test. In other cases, external leads from the tester are brought to the battery terminals to initiate the test. In some cases, the state of charge reading is monitored continuously by the test instrument but in most cases is done briefly in order to provide a quick sampling of state of charge.

The principal problem with all of these methods is that an external tester of some kind must be used to measure the state of charge of primary batteries. The battery alone will not render any state of charge information to the user.

Accordingly, it is an object of the invention to provide state of charge information of a primary battery by installing an indicator on the battery.

It is a further object of the invention to provide state of charge information of a primary battery by installing an indicator that is always monitoring the state of charge continuously without a need for a switch or activator.

It is a further object of the invention to provide a state of charge indicator that can be installed as a permanent part of a battery without causing any drain or reduction in performance of the battery.

It is a further object of the invention to provide a state of charge indicator that can be installed as a permanent part of a battery without changing any of the outside dimensions of the battery.

It is a further object of the invention to provide a state of charge indicator that can be installed as a permanent part of a battery without changing the standard contact formats of the battery.

It is a further object of the invention to provide a state of charge indicator that is installed as a permanent part of a battery with an indicator display that is easy to read and understand.

SUMMARY OF THE INVENTION

Briefly, in one embodiment the invention provides a battery charge indicator which is comprised of a first means to define a compressible chamber for containing a viscous gel and having an outlet therefrom as well as a second means to define a viewing channel of predetermined shape in communication with the outlet of the chamber in order to receive a flow of gel therefrom in an amount corresponding to a predetermined compression of the chamber.

The battery charge indicator is incorporated into a battery, such as an alkaline battery, including a housing having an internally contained chemical cathode and anode for generating an electrical current with the cathode expanding in an amount proportional to the total current generated. The battery charge indicator is incorporated in the alkaline battery in such a manner that the compressible chamber is exposed to the cathode for compression thereby in response to an expansion of the cathode.

The cooperation between the battery charge indicator and the alkaline battery is such that when there is an electrical discharge from the battery, the internal components of the battery expand accumulatively as the battery discharges rendering a force that can be used to operate the built in battery charge indicator so as to indicate the enclosed expansion which is inversely proportional to the remaining charge in the battery. The battery charge indicator thus operates mechanically to amplify the expansion of the cathode so as to render a continuous sensitive visual state of charge indication.

The battery charge indicator is typically installed at one end of the battery as a permanent part of the finished product. Further, the indicator is constructed so as to render a visual indication of the state of charge in an analog manner.

In one case, the means for defining a compressible chamber is formed of a cap having a flexible section and a disk disposed on the cap so as to define the compressible chamber therebetween. In this embodiment, an outlet is disposed centrally of the disk so as to permit a viscous gel to be expelled from the chamber proportionally in response to the compression of the chamber caused by the expansion of the cathode of the battery. In this embodiment, the means defining the viewing channel may be in the form of a second disk which is mounted over the disk which forms the compressible chamber. Further, this second disk may have the viewing channel formed therein, for example, in the form of a radially disposed section which extends from the outlet of the compressible chamber and a circular section which extends from an outer end of the radially disposed section. The viewing channel may also terminate in a reservoir located at one end of the circular section of the channel.

A cover is also disposed over the viewing channel of the battery charge indicator, for example being a positive cover for the battery. In addition, the cover has a plurality of spaced apart apertures overlying the viewing channel so as to permit viewing thereof. Thus, as the gel is extruded into the viewing channel in response to the compression of the compressible chamber, the extent of the gel within the channel can be viewed. As the extent of extrusion provides an indication of the remaining charge in the battery, a simple visual indication of the remaining Life of the Battery is provided.

In another embodiment, the compressible chamber for the gel is provided by a closed flexible end of the battery housing and a disk which is disposed over the closed flexible end of the housing. As above, this disk is provided with an outlet into a viewing channel within an overlying second disk which is held over the end of the battery housing, for example by means of a positive cover having apertures for viewing of the channel.

In still another embodiment, the compressible chamber of the battery charge indicator may be in the form of a flexible tube of elongated shape which is disposed within the battery housing by being passed through an opening in a closed end of the housing. This tube is also provided with an outlet at one end for the gel as well as an overlying disk having a viewing channel therein for receiving the gel extruded from the flexible tube.

In order to permit viewing of the gel within the viewing channels of the various embodiments, the disk in which the channel is formed may be made of transparent or translucent material.

In still another embodiment, the alkaline battery is constructed of a housing having a closed end wall and a deformable wall against which the cathode expands when electrical current is being generated. In addition, a piston assembly is disposed in contact with the deformable end wall for movement therewith while a means is provided for measuring the amount of movement of the piston assembly in order to provide a visual indication of the remaining amount of the expected expansion of the cathode.

The piston assembly may be constructed to include a guide pin which is disposed in contact and which extends longitudinally from the deformable end wall of the housing and an annular disc mounted on the pin for movement therewith. In this case, the means for measuring the movement of the piston assembly includes a reflector having a central bore slidably receiving the disc, a lens for viewing a reflection of a side face of the disc from the reflector and a cover having at least one aperture overlying the lens for viewing the reflection.

The disc is provided with a flat peripheral wall which is provided with an indicia to provide a visual reflected image corresponding to the remaining amount of expected expansion of the cathode, that is, the remaining amount of charge. The indicia may be in the form of a band of color or multiple bands of different color.

In use, as the battery discharges, the deformable end of the battery will expand outwardly thus causing the piston assembly to move outwardly of the housing. By means of the lens and reflector, the peripheral wall of the disc of the piston assembly can come into view with the band of color on the wall providing a measure of the amount of movement of the piston and, thus, the remaining amount of charge.

These and other objects and advantages of the invention will become more apparent from the following detailed description taken in conjunction with the accompanying drawings wherein:

DETAILED DESCRIPTION OF THE PREFERRED EMBODIMENT

Figure 1:
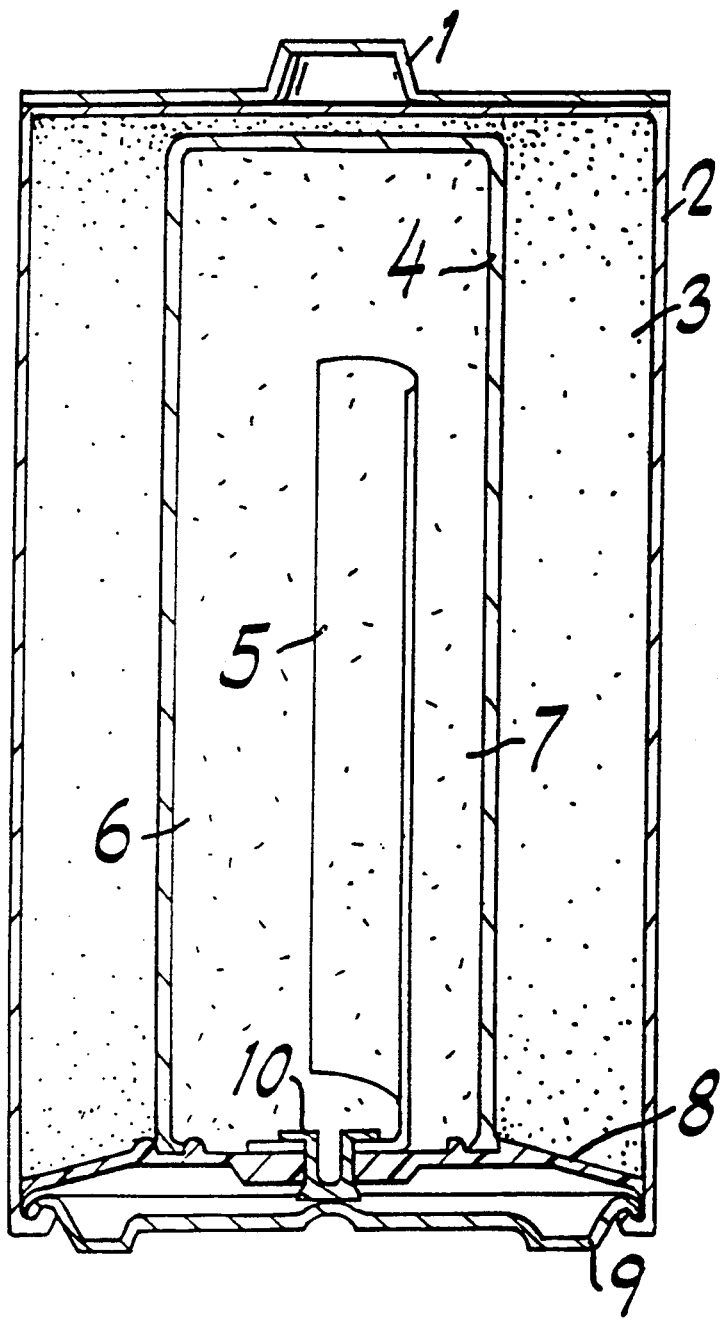
FIG. 1 is a cross sectional view of a standard alkaline battery.

Referring to FIG. 1, a standard alkaline battery is constructed of housing formed by a drawn steel can 2 with one closed end and the other end sealed with a nylon member 8. A positive cover 1 is spot welded separately to the steel can 2 at the closed end. Inside the can 2 are the basic components of an alkaline long life battery. The two major areas are a cathode 3 and an anode 6 divided by a non-woven fabric 4 which acts as a separator for the two major chemical components which are manganese dioxide 3 and powdered zinc 6 with potassium hydroxide as an electrolyte. In the inside of the center area is a brass member 5 which acts as a current collector that passes through the nylon seal 8 by means of a rivet 10 which makes contact with a negative cover 9. When the circuit is closed by connecting the anode 6 to the cathode 3 through some kind of load, a current will develop within the battery causing the cathode 3 to expand as the battery is discharged. The expansion is irreversible and accumulative and can be calculated for specific size alkaline batteries. The expansion has a predictable characteristic which can be linear, exploritol, or non-linear. Regardless of the particularly characteristic, the total expansion reached is a function of the total current taken from the battery. If the current flow is substantial then the expansion will proceed rapidly. If the current flow is low then the expansion will proceed slowly. The result in either manner is an accumulative irreversible expansion representing the amount of power dissipated by the battery. The expansion is relatively small and usually not visually distinguishable without the aid of measuring devices such as micrometers.

Figure 2:
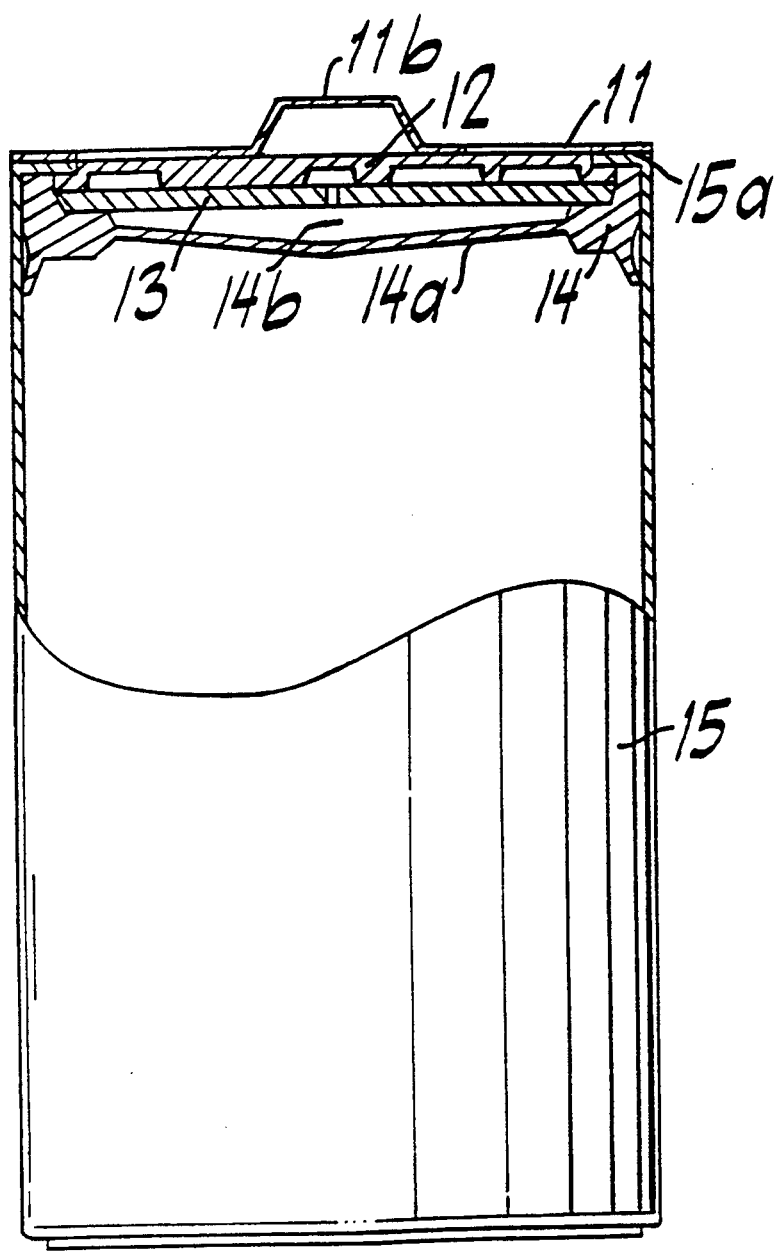
FIG. 2 is a cross sectional view of a battery employing a charge indicator in accordance with the invention.
Figure 2A:
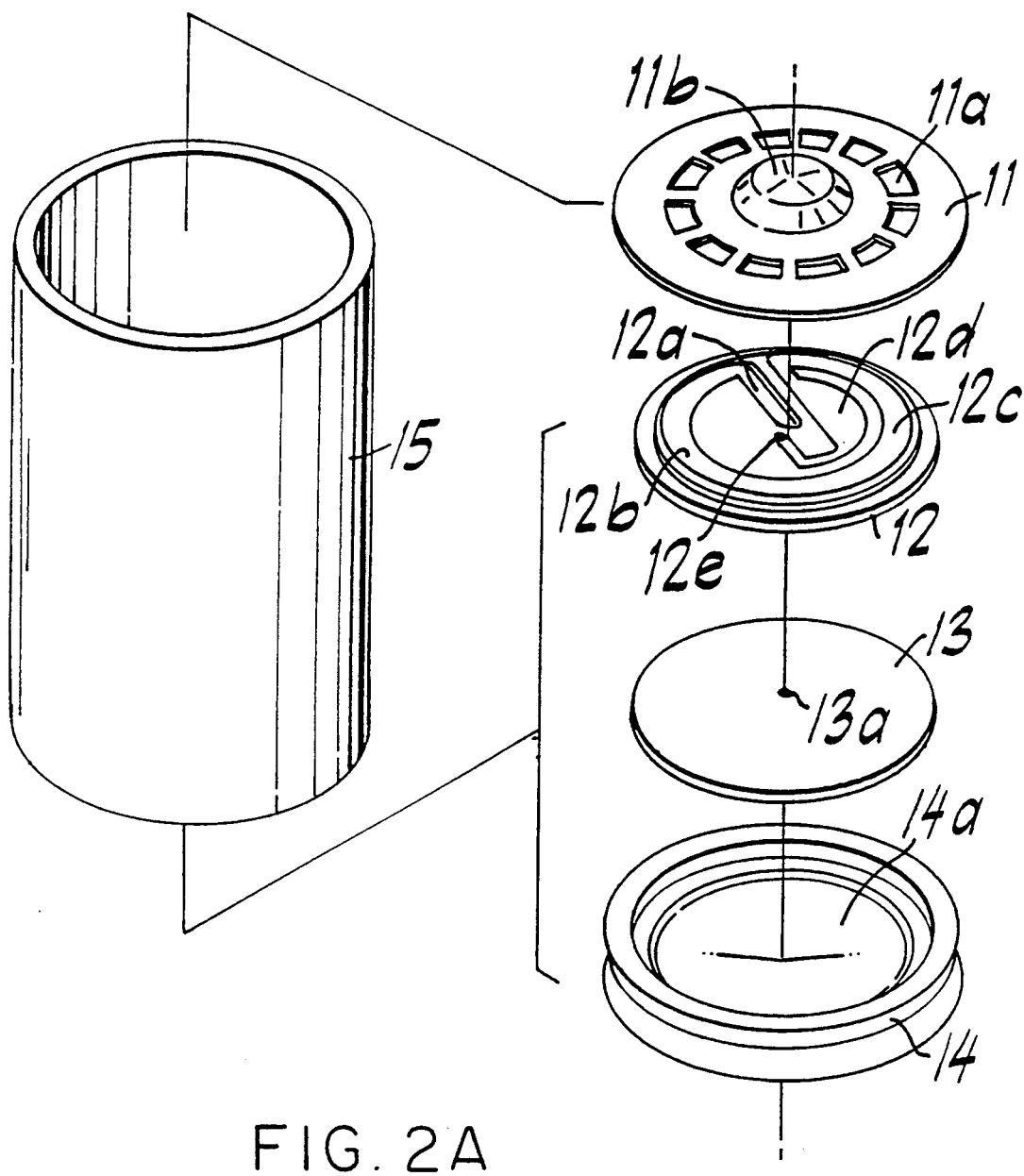
FIG. 2A is an exploded view of a major components of the battery and indicator of FIG. 2.

Referring to FIGS. 2 and 2A, an alkaline battery having a housing, such as a steel can 15, encloses the components detailed in FIG. 1 particularly the chemical cathode and anode for generating an electrical current with the cathode expanding in an amount proportional to the total current generated. In addition, a battery charge indicator is incorporated in the battery at the top and is composed of four parts 11, 12, 13, 14 which replace the closed end of the steel can of a standard battery and which are also shown in exploded view in FIG. 2A.

The lowermost part 14 of the battery charge indicator is in the form of a cap having a flexible section 14A facing the internal components of the battery and which will move like a diaphragm when the internal components of the battery expand. In addition, the next component 13 is in the form of a disk which is disposed over the cap 14 in order to define a compressible chamber 14B (see FIG. 2) for receiving a highly viscous gel (not shown). The disk 13 is also provided with an outlet 13a centrally of the disk 13 to permit the gel to be expelled through the outlet 13a in proportional response to the compression of the chamber 14b. The gel or other similar material is characterized in being a non-compressible flowable material which will not leak out of the outlet 13a of the disk 13.

The cap 14 and disk 13 thus serve as a means to define the compressible chamber 14b for containing the viscous gel.

The next component 12 of the charge indicator is a means in the form of a disk which defines a viewing channel 12a, 12b, 12c of predetermined shape. As shown in FIG. 2a, the channel has a radially disposed section 12a which extends from the outlet 13a of the disk 13 so as to receive extruded gel therein. This section 12a communicates at the end with a circular section 12b so as to direct the gel about the disk 12 into the circular section 12c. In addition, a reservoir 12d is formed within the disk 12 in order to communicate with the terminal end of the channel section 12c. A vent hole 12e is also provided in the disk 12 in order to vent the channel.

The uppermost component 11 of the indicator is in the form of a positive cover secured over the battery housing 15. This cover 11 has a plurality of spaced apart apertures 11a which overly the channel sections 12b, 12c of the disk 12 in order to permit viewing of any gel therein. The cover 11 provides a normal connection to the housing 15 and thus the cathode of the battery as well as having a raised tip 11b for conventional purposes.

During normal operation of the battery, a current is generated and discharged. This in turn causes the cathode to expand in the usual manner. The expansion of the cathode, in turn, causes the flexible section 14a of the cap 14 to move.

The movement of the flexible section 14a compresses the gel mixture (not shown) which is stored in the chamber 14b. The pressure of the expansion of the internal components due to discharge of the battery, thus causes the gel to move through the outlet 13a and into the viewing channel section 12a. The gel, being of very high viscosity, will remain at whatever point it reaches in the channel sections 12a, 12b, 12c even if the battery is disconnected and is not being discharged. When the battery is new and not connected to a load, there is no internal expansion.

The high viscosity gel will remain in the chamber 14b at the outlet 13a indefinitely until a current is generated by connecting the cathode to the anode.

When the battery is discharged, internal expansion begins to place pressure on the diaphragm 14a causing the gel to move through the outlet 13a and into the viewing channel 12a, 12b, 12c at a rate and distance which is determined by the expansion of the internal components which is a function of the discharge rate of the battery. As the battery is discharged and the expansion continues to push on the diaphragm 14a, the gel will move further and further through the viewing channel in a circular manner along the channel sections (12a, 12b and 12c) until reaching the reservoir 12d. The total length of the viewing channel and reservoir is calculated to accept the total amount of high viscosity gel that is stored in the chamber 14b. The total volume of gel will be pushed through the viewing channel by the total accumulative expansion of the internal components of the battery.

The vent hole 12e at the end of the viewing channel allows the high viscosity gel to move against normal atmospheric pressure.

The positive cover 11 dimensions and in particular the tip 11b are designed along standard accepted dimensions for D, C, AA and AAA batteries. The apertures 11a are arranged in a circular manner over the viewing channel 12b, 12c which eliminates alignment requirements for the indication of battery state of charge. When the gel is not visible in any of the apertures 11a the battery is said to be at full charge. As the battery is discharged and gel begins to move through the viewing channel, the gel will eventually become visible in one of the apertures. As the battery discharges further, the gel will continue to move through the viewing channel and will be visible in another aperture in addition to the first one next to it. This process will continue until the battery totally discharges, causing the gel to move the entire length of the viewing channel allowing the gel to be visible in all the apertures in the positive cover 11 which would indicate to the observer that the battery is totally discharged. By confining the expelled gel to a confined viewing channel of a length corresponding to the expected total expansion of the cathode provides a visual indication of the remaining amount of expected expansion of the cathode and, thus, the remaining life of the battery.

In order to have visible contrast, the gel may be mixed with a dye or pigment which will give the gel a deep nontransparent color that can be easily seen through the apertures 11a. In order to increase the contrast even further, the disc 13 can be of a color that would enhance the visual effect. If the gel were dyed with the deep color red and the disc 13 were molded for example of polyamide, such as nylon, with a green color the effect would be red gel covering a green background in the viewing channel. The result would be a circular array of apertures that are all green when the battery is at full charge and all red when the battery is totally discharged. If the battery is only half charged, then half of the apertures would be red and the other half would be green. All partial states of charge would be indicated by the ratio of red to green apertures. The total assembly which includes all the components 12, 13 and 14 can be manufactured as a complete unit that would be fitted in one end of the steel can 15 that eventually accepts the modified positive cover 11 that is tack welded to the can at various points 15a. When the assembly 12, 13 and 14 is in place, the assembly also acts as a seal confining the active ingredients of the battery inside the can 15 while the negative seal 8 shown in FIG. 1 seals the other end of the can 15.

Figure 3:
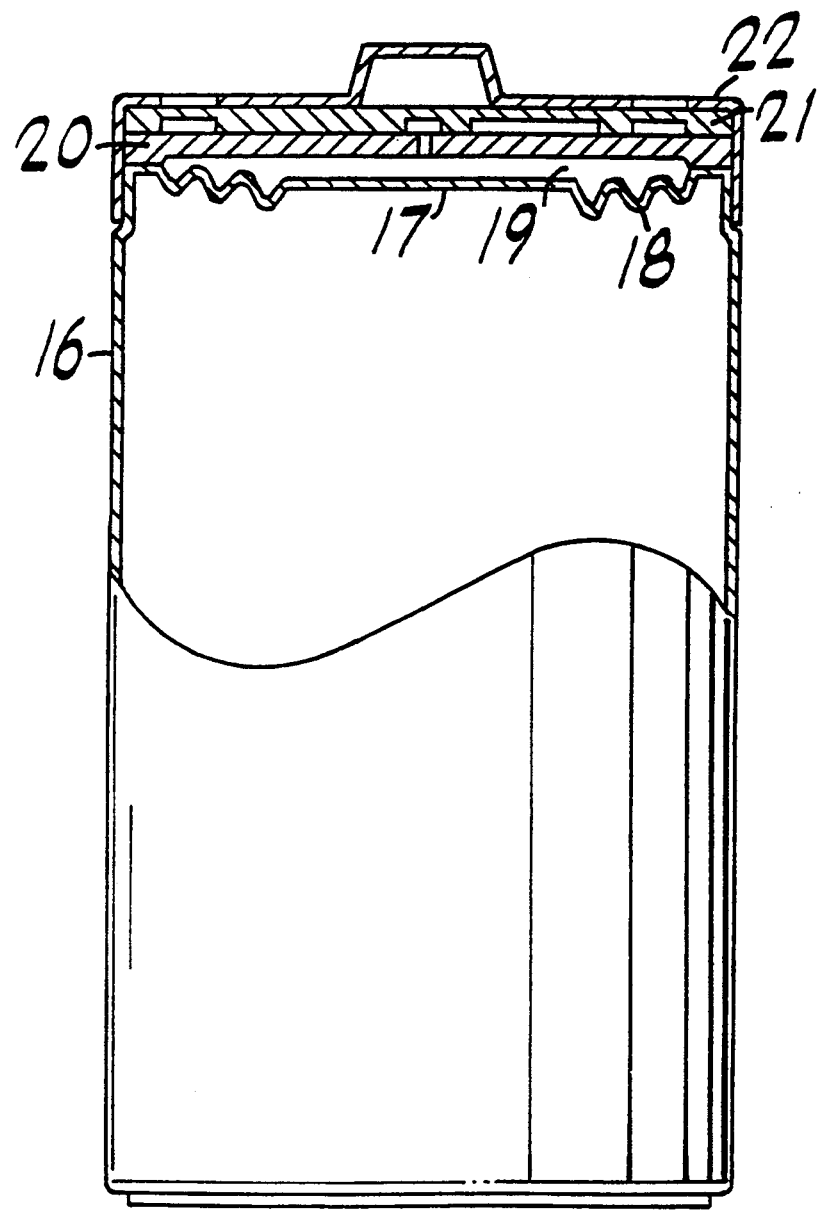
FIG. 3 is a cross sectional view of an additional embodiment of the invention.
Figure 3A:
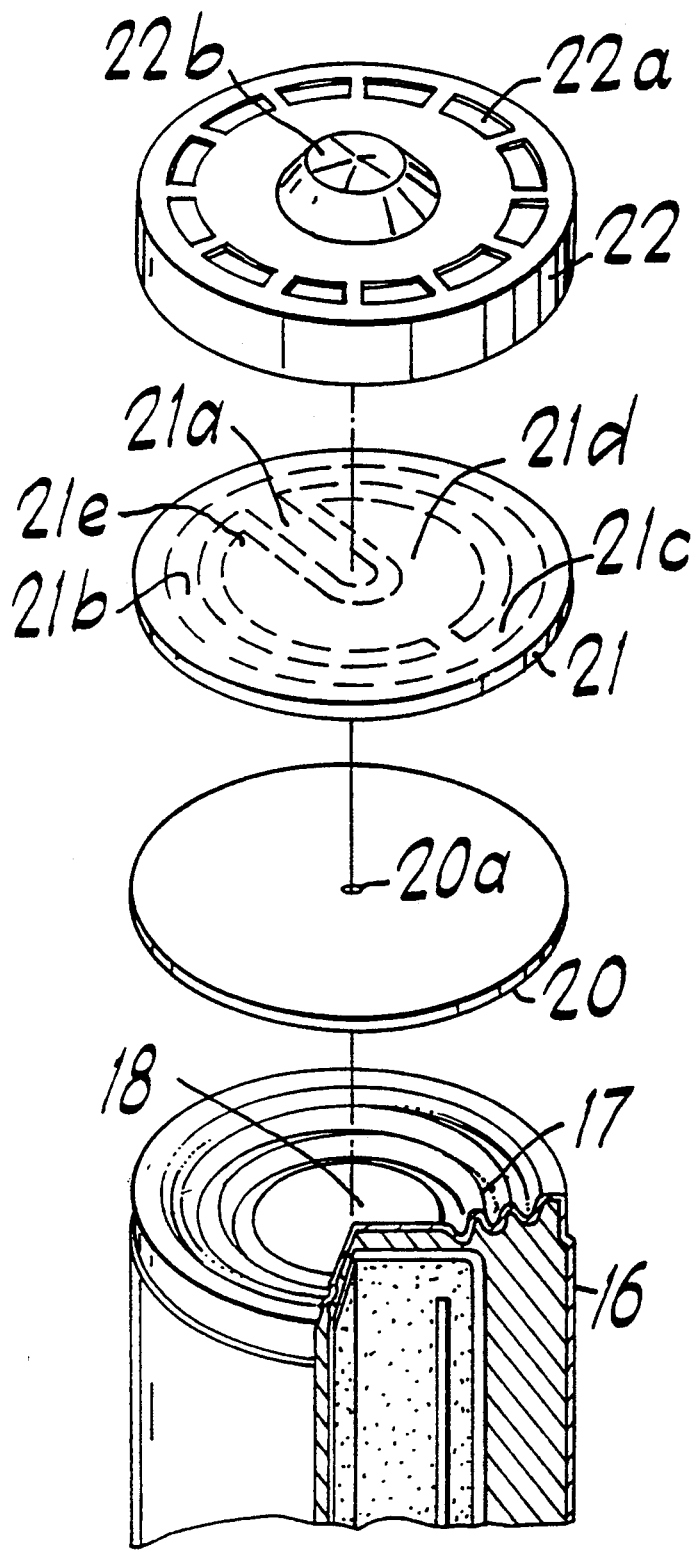
FIG. 3A is an exploded view of a part of the battery and indicator embodiment of FIG. 3.

Referring to FIGS. 3 and 3a, the battery may be constructed with a housing 16 in the form of a steel can having a flexible closed end formed of a flexible central section 17 and a plurality of circular ridges 18 about the central section 17. The central section 17 is sufficiently flexible to move when the internal expansion of the battery occurs. In addition, a disk 20 is disposed over the flexible closed end of the housing 16 so as to form a compressible chamber therebetween to receive a high viscosity gel 19. As above, a further disk 21 is mounted over the disk 20 and has a viewing channel therein for receiving gel 19 which is extruded through an outlet 20a in the disk 20 (see FIG. 3a). Cover 22 having a plurality of spaced apart apertures 22 and tip 22 is disposed over disc 21.

As shown in FIG. 3a, the viewing channel in the disk 21 is formed by a radially disposed section 21a which receives the extruded gel from the outlet 20a in the disk 20 and a pair of circular sections 21b, 21c which extend as branches from the radially disposed section 21a. These two circular sections 21b, 21c terminate at a point which communicates with a reservoir 21d disposed centrally within the disk 21. A suitable vent hole 21e is also provided in communication with the reservoir 21d at a point remote from the point at which the reservoir 21d receives gel from the circular channel sections 21b, 21c.

During operation, the movement of the diaphragm 17 compresses the gel 19 which is stored in the compressible chamber. The pressure of the expansion of the internal components due to discharge of the battery, causes the gel 19 to move through the outlet 20a into the viewing channel 21a as above described. The gel being of very high viscosity will remain at whatever point reached in the channel even if the battery is disconnected and not being discharged. When the battery is new and not connected to a load there is no internal expansion.

Figure 3B:
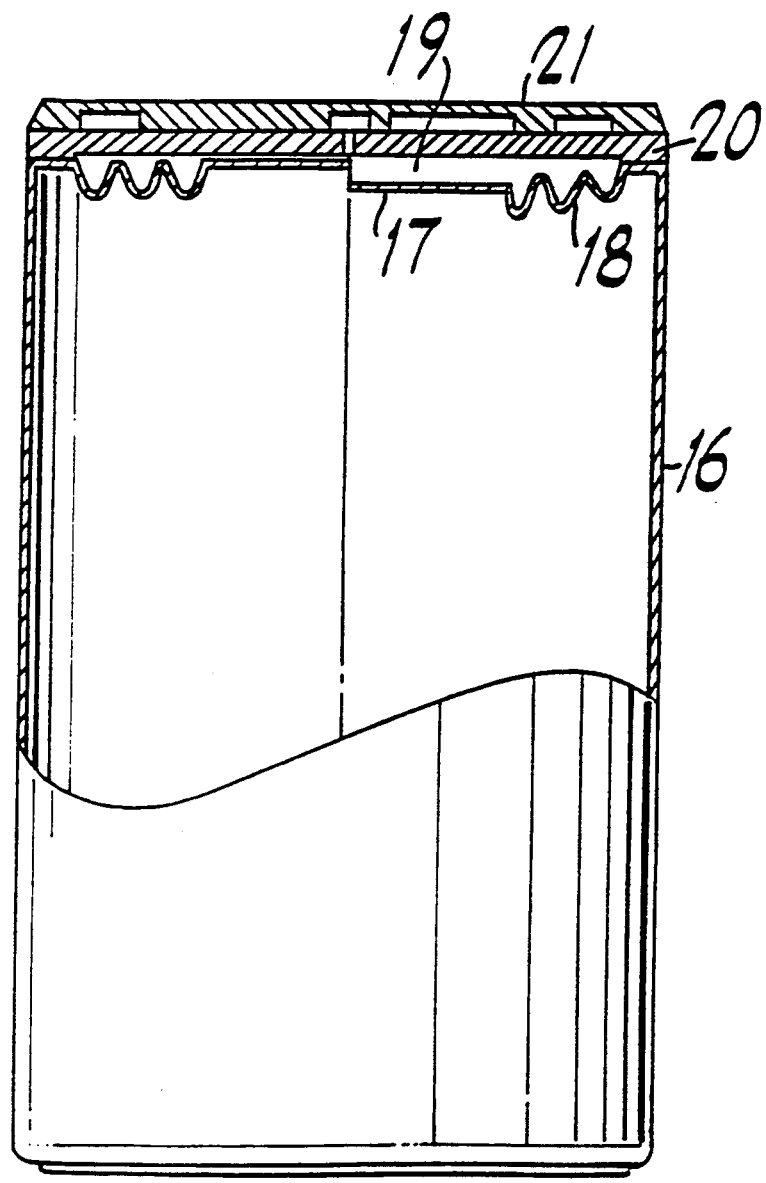
FIG. 3B is a functional cross sectional view of the embodiment of FIG. 3.

FIG. 3B is functional view of the diaphragm-like closed end of the battery housing and viewing channel. The right side of the split image figure depicts the diaphragm (17, 18) in the beginning position with the central section 17 sitting below the disc 20 with the full amount of gel 19 present in the chamber. The left side of the split image figure depicts the diaphragm (17, 18) in the discharged position with the central section 17 pressed up against the disc 20 with the majority of the gel pushed into the viewing channel.

Figure 4:
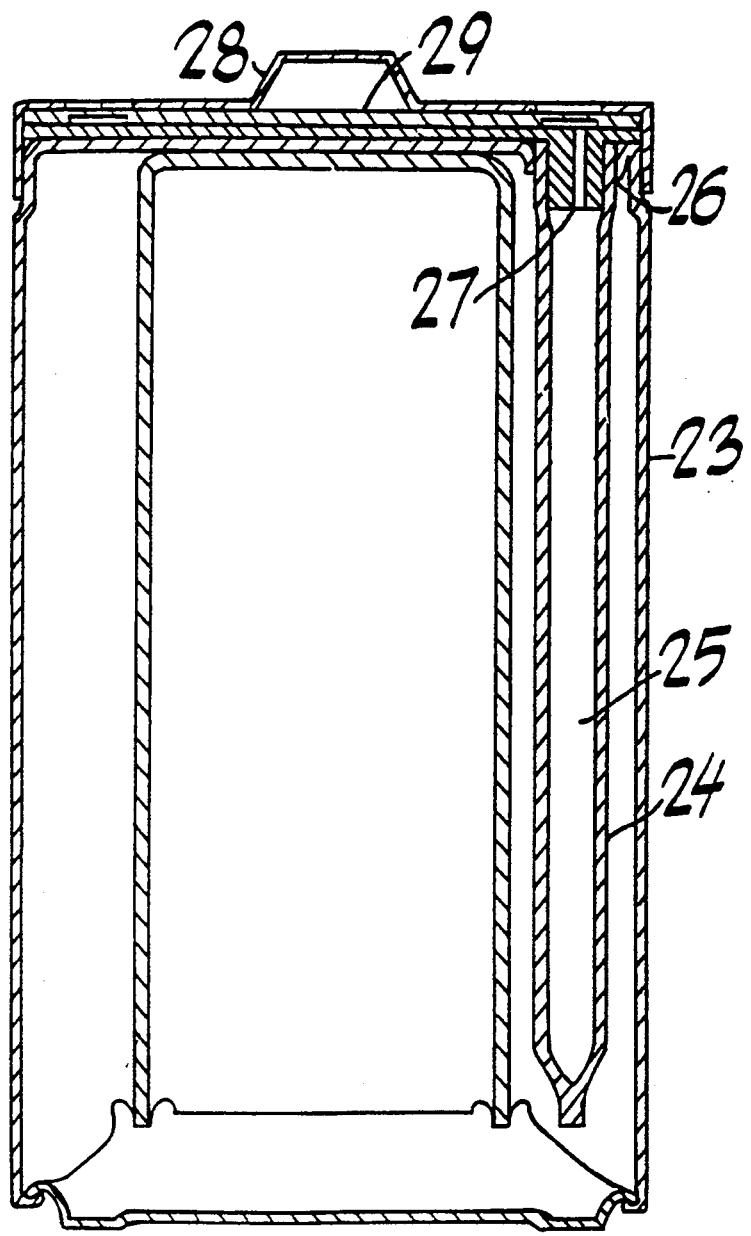
FIG. 4 is a cross sectional view of an another embodiment of the invention.
Figure 4A:
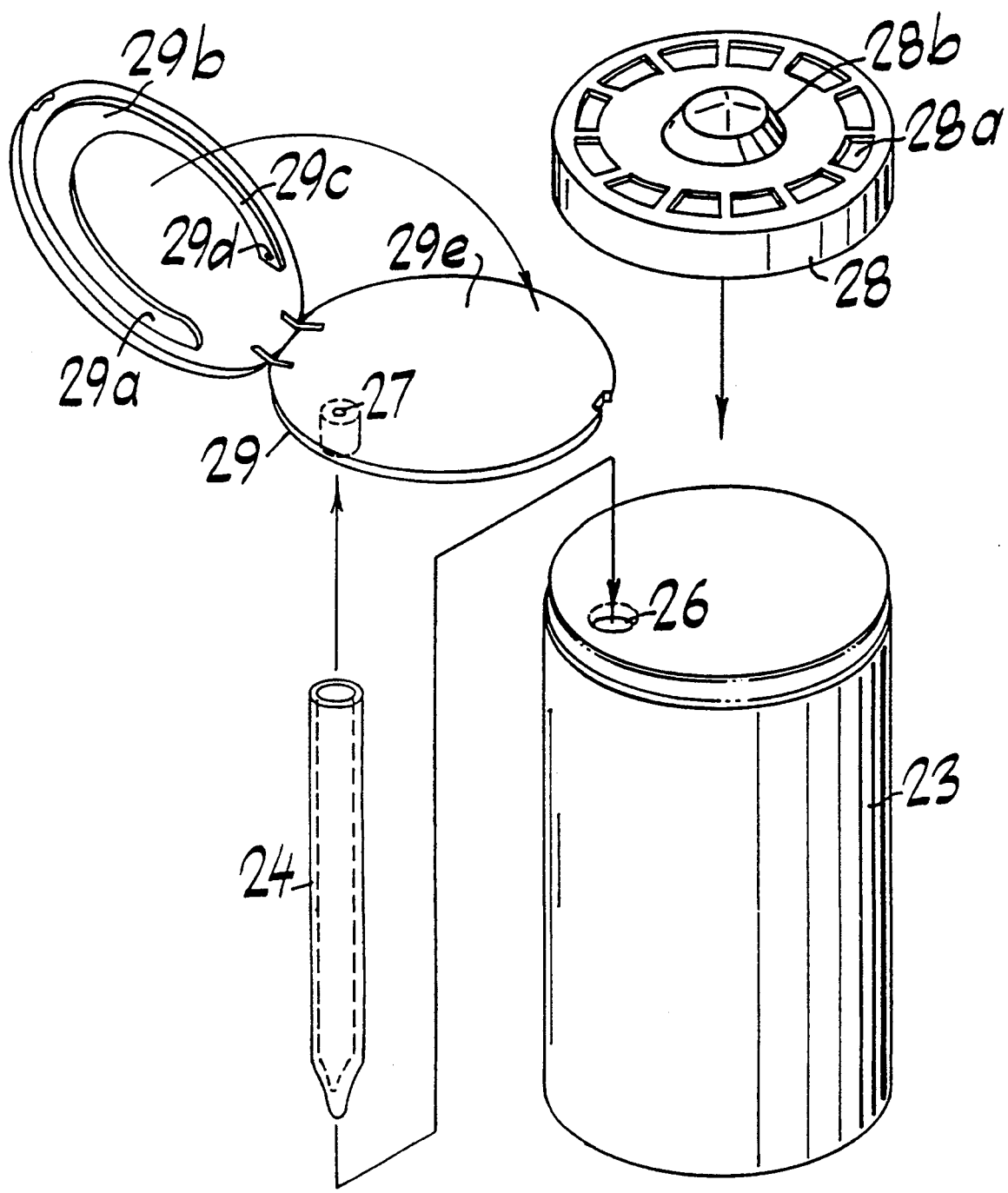
FIG. 4A is an exploded view of the major components of the embodiment of FIG. 4.

Referring to FIGS. 4 and 4a, the alkaline battery may have a housing in the form of a steel can 23 having a closed end modified by drilling or forming a hole 26. In this embodiment, the battery charge indicator is composed of an elongated tube 24 which defines a compressible chamber 25 for containing a highly viscous gel. The overall shape of the tube may be asymetrical to reduce compression resistance. This tube 24 is sized so as to pass through the hole 26 in the battery housing.

As indicated, an expansion sensing mechanism 29 in the form of a pair of hinged disks is mounted over the end of the battery housing 23 and held captive by a positive plate 28 which is tack welded to the housing 23.

The lower disk 29e of the expansion sensing mechanism 29 has a stub integrally formed thereon which is sized to be inserted into the elongated tube 24 in sealed relation and which has a centrally disposed outlet opening 27 communicating with the chamber 25 within the tube 24 (see FIG. 4).

The upper disk of the expansion sensing mechanism 29 has a viewing channel 29a, 29b, 29c of circular shape which extends from a point over the outlet 27 to a vent hole 29d as indicated in FIG. 4a. A tab is also provided on this disk so as to fit within a notch of the other disk of the expansion sensing mechanism 29, for example in a snap fit relation.

The cover 28 has a plurality of spaced apart apertures 28a, as above, as well as a tip 28b.

In operation, the pressure of the expansion of the internal components due to discharge of the battery, causes the gel in the tube 24 to move through the outlet 27 and into the viewing channel 29a, 29b, 29c as above. The gel being of very high viscosity will remain at whatever point reached in the channel even if the battery is disconnected and not being discharged.

As the battery is discharged and the expansion continues to crush the flexible tube 24, the gel will move further and further through the viewing channel in a circular manner along the sections 29a, 29b and 29c. The total distance and length of the viewing channel is calculated to accept the total amount of high viscosity gel that is stored in the flexible tube 24. The total volume of gel will be pushed through the viewing channel 29 by the total accumulative expansion of the internal components of the battery.

In order to increase the contrast between the gel and the disc of the expansion sensing mechanism 29 even further, the bottom surface 29e (i.e. lower disc) of the viewing channel can be of a color that would enhance the visual effect. If the gel is dyed with the deep color red and the bottom surface 29e of the viewing disc is molded in green, the effect would be a red gel covering a green background in the viewing channel. The result would be a circular array of apertures that are all green when the battery is at full charge and all red when the battery is totally discharged. If the battery is only half charged then half of the apertures would be red and the other half would be green. All partial states of charge would be indicated by the ratio of red to green apertures.

Figure 5A:
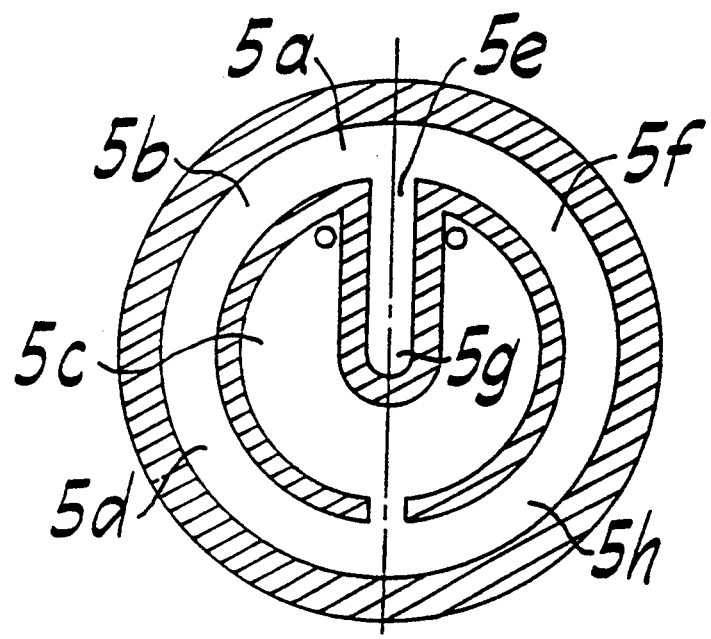
FIG. 5 is a detail of two embodiments of the viewing channel patterns used in the embodiments of FIGS. 2 through 4.
Figure 5B:
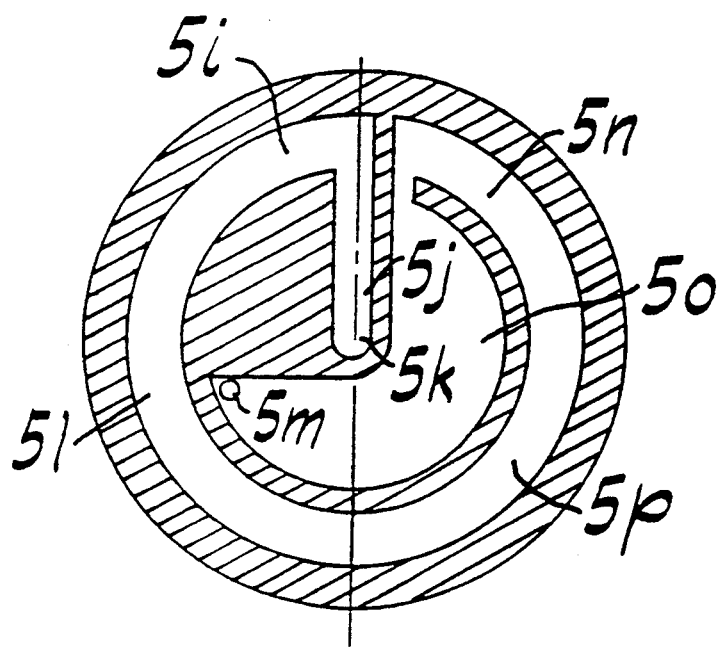

FIGS. 5A and 5B depict two specific patterns used in the viewing channel components of the first three embodiments. In one of these examples, (FIG. 5A) the gel enters the viewing channel in the center 5g of the confined path. The gel will then move down a corridor 5e to the viewing channel (5a, 5d, 5h and 5f) which is molded in the perimeter of the viewing channel. When the gel reaches the entrance to the viewing channel which is at the end of the corridor 5e it will split into two paths designated as 5b, 5d and 5f, 5h. The divided gel moves around the perimeter in opposite directions until recombining at the entrance to a reservoir 5c and continues into the reservoir 5c. The visual effect to the observer, looking through the positive plate aperture arrangement described above, would be a circular array of apertures changing color in two directions at the same time. It should be noted that the reservoir 5c and the corridor 5e are both out of view in that the only gel visible is the gel under the apertures in the perimeter of the viewing channel. In the other example, (FIG. 5B) the gel enters the viewing channel in the center 5k of the confined path. The gel will then move down a corridor 5j to the viewing channel 5i, 5l, 5p and 5n which is molded in the perimeter of the viewing channel. When the gel reaches the entrance to the viewing channel, which is at the end of the corridor 5j, it will move along the confined path 5i, 5l, 5p and 5n along the perimeter of the viewing channel until reaching the reservoir 5o having vent hole 5m. The visual effect to the observer, looking at the gel through the positive plate aperture arrangement described above, would be a circular array of dots changing color in a single direction. It should be noted that the reservoir 5o and the corridor 5j are both out of view in that the only gel visible is the gel under the apertures in the perimeters of the viewing channel.

Figure 6:
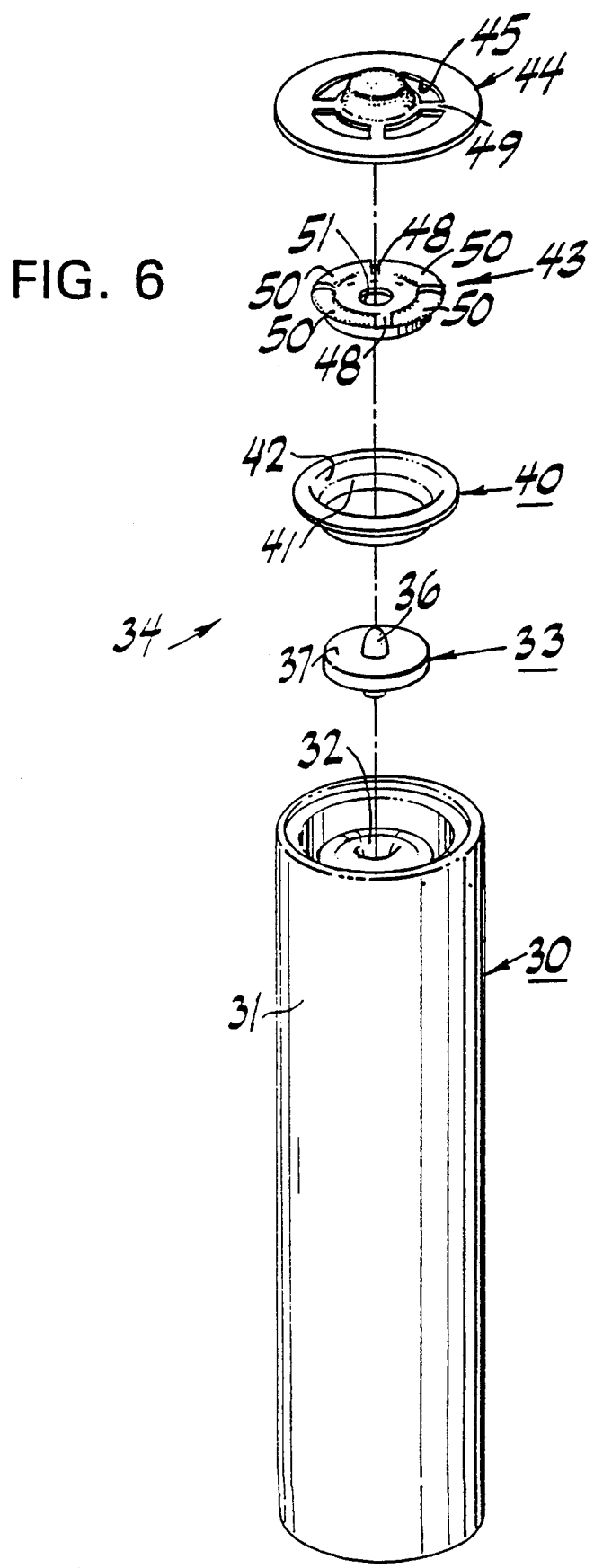
FIG. 6 illustrates an exploded view of a further embodiment of a battery constructed in accordance with the invention.

Referring to FIG. 6, an alkaline cell or battery 30 is of standard construction with a housing 31 having a closed end (not shown) an internally contained chemical cathode (not shown) and an internally contained anode (not shown) for generating an electrical current with the cathode. In addition, the battery 30 is provided with a deformable end wall 32 which is caused to expand under the expanding force generated by the cathode during discharge of the battery and cooperates with a battery charge indicator which includes a means in the form of a piston assembly 33 (rather than a gel) mounted in contact with the deformable end wall of the battery 30 for movement therewith and a second means 34 for measuring the amount of movement of the piston assembly 33 in order to provide a visual indication of the remaining amount of expected expansion of the cathode (not shown).

Figure 7:
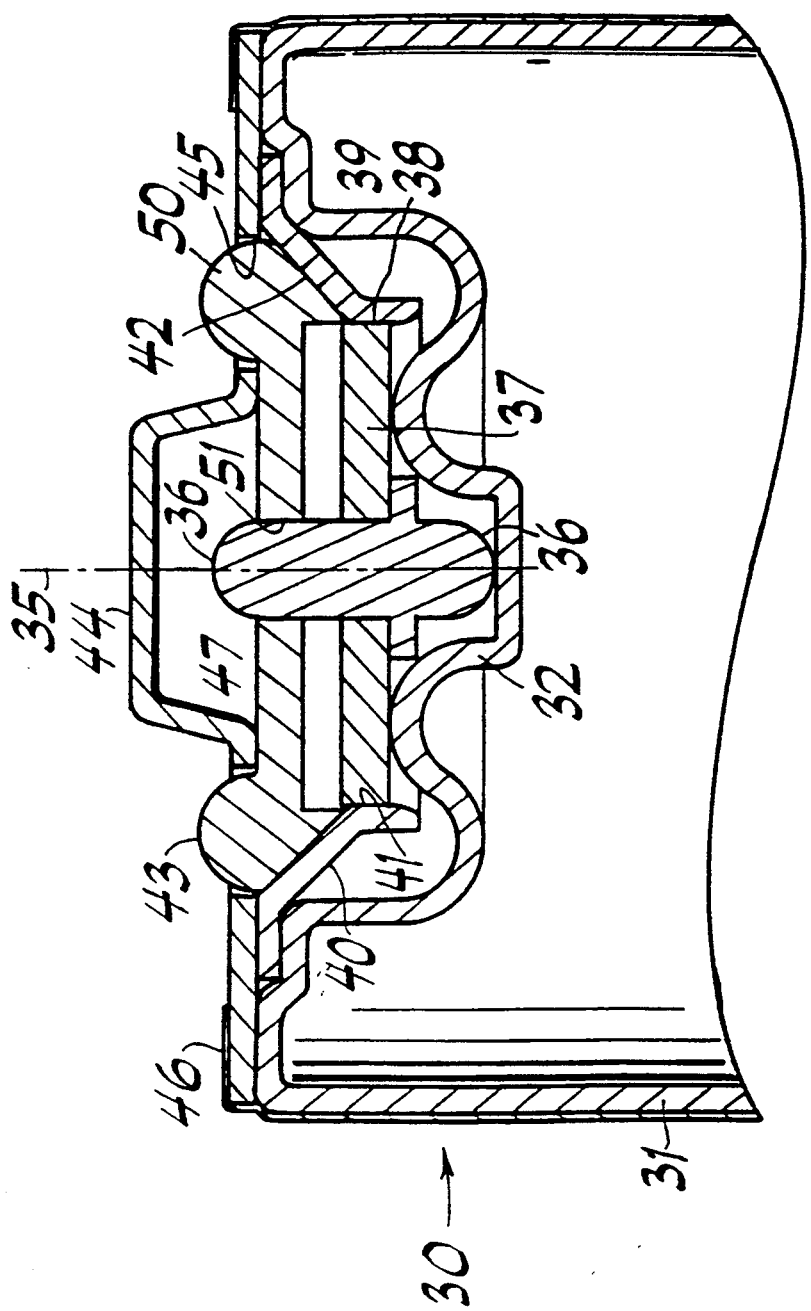
FIG. 7 illustrates a part cross-sectional view of the battery of FIG. 6 with the piston assembly in a fully charged condition of the battery.

Referring to FIG. 7, wherein like reference characters indicate like parts as above, the deformable end wall 32 of the housing 31 is of a generally corrugated disc-like shape which is symmetrical about a longitudinal axis 35 of the housing 31. During expansion of the cathode (not shown), the deformable wall 32 would move upwardly, as viewed.

The piston assembly 33 includes a guide pin 36 in contact with and extending longitudinally from the deformable end wall 32 on the axis 35 of the housing 31. In addition, the piston assembly 33 includes a piston in the form of an annular disc 37 which is mounted on the pin 36 for movement therewith. The disc 37 has a flat peripheral wall 38 which has indicia 39, for example in the form of a band of color or other suitable markings.

The means 34 for measuring the amount of movement of the piston assembly 33 includes a reflector 40 which has a central bore 41 slidably receiving the disc 37 in recessed manner. In addition, the reflector 40 has a reflective surface 42 which is disposed on a conical angle relative to the axis 35 of the housing 31 for the purposes as explained below.

The means for measuring the movement of the piston assembly 33 also includes a lens 43 for reviewing a reflection of a side face of the disc 37 from the reflective surface 42 of the reflector 40 as well as the positive cover 44 having a plurality of apertures 45 overlying the lens 43 for viewing the reflection.

A suitable wrapper 46 may also be provided over the end of the housing 31 after the positive cover 44 is spot welded in place. As shown in FIG. 7, the cover 44 serves to contain the reflector 40 in a recessed manner within the end wall 32 of the battery housing 31.

As shown in FIGS. 6 and 7, the reflector 40 is of annular shape. In addition, the lens 43 is of annular shape and is provided with a central recess 47 sized to receive the disc 37 (see FIG. 8) with a small clearance. The lens 43 is also provided with a plurality of cut-outs 48 as shown in FIG. 6 in order to accommodate corresponding ribs 49 on the cover 44. In this way, the lens 43 has arcuate segments 50 which project through the apertures 45 of the cover 44. Still further, the lens 43 is provided with a central aperture 51 so as to permit slidable movement of the guide pin 36 therethrough.

Figure 8:
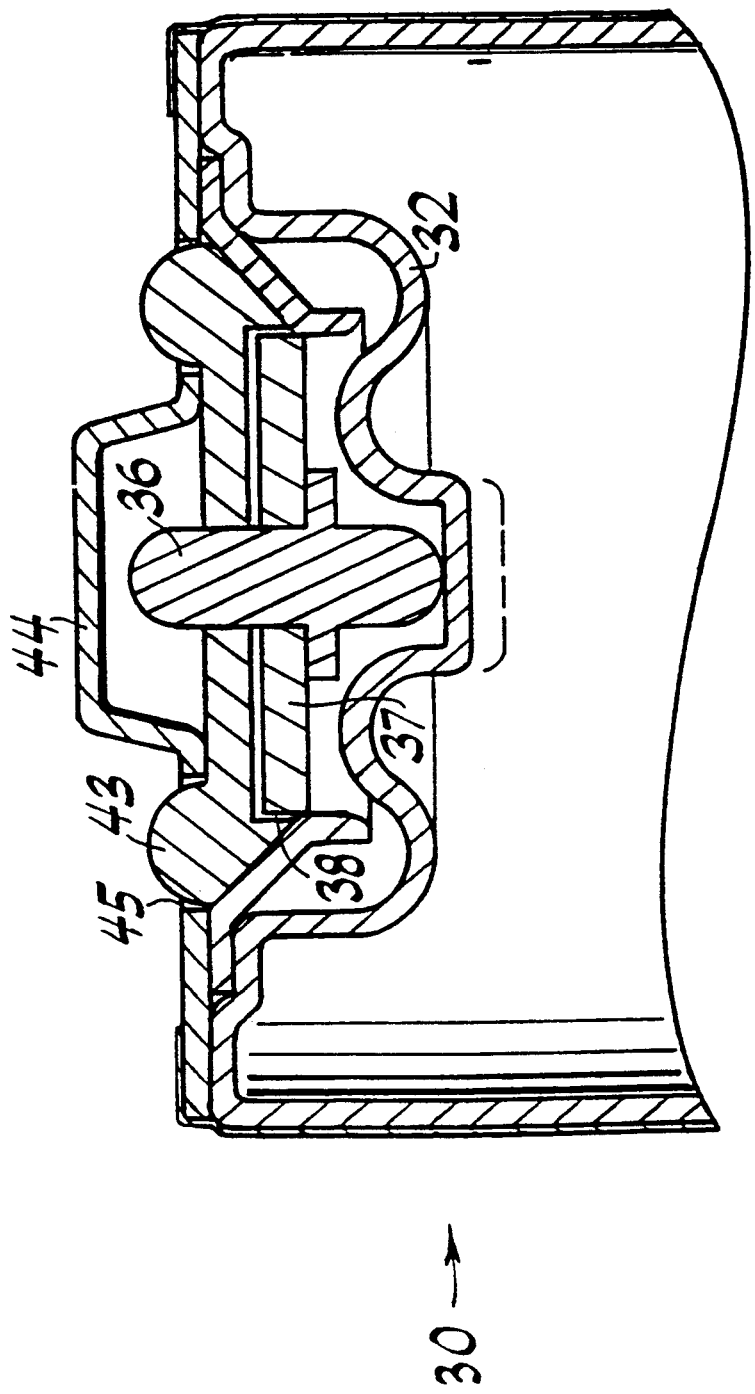
FIG. 8 illustrates a cross sectional view of the piston assembly in a fully discharged condition of the battery.

Referring to FIG. 8, wherein like reference characters indicate like parts as above, the deformable end wall 32 of the battery 30 is shaped to expand upwardly, as viewed. This causes the guide pin 36 and thus the disc 37 to move upwardly with the end wall 32. As a result, the disc 37 begins to move out of the recessed position within the reflector 40 while moving into a viewing area provided within the recessed portion 47 of the lens 43. Thus, the indicia 39 on the peripheral wall 38 of the disc 37 is reflected from the reflective surface 42 of the reflector 40 through the lens 43. This provides a visual indication of the amount of movement of the disc 37 out of the bore of the reflector 40.

Figure 9:
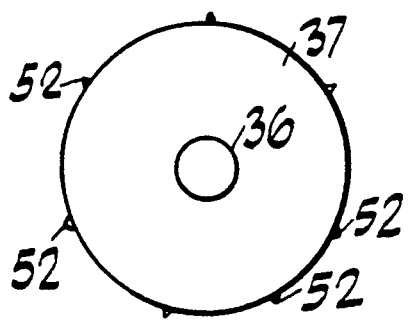
FIG. 9 illustrates a plan view of a piston assembly constructed in accordance with the invention.
Figure 10:
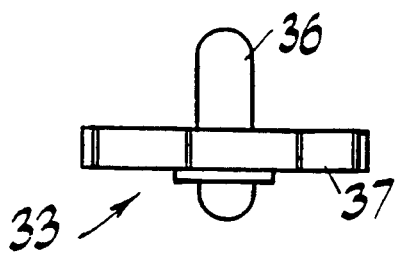
FIG. 10 illustrates a side view of the piston assembly of FIG. 9.

Referring to FIGS. 9 and 10, wherein like reference characters indicate like parts as above, the piston assembly 33' has a disc 37 which is provided with a plurality of splines 52 on the peripheral wall 38 at uneven spacings to contact the reflector 40 (not shown) so as to impose a variable friction force on the disc 37 during upward movement in order to effect movement of the disc 37 at an angle to the housing axis 35. As shown in FIG. 9, a greater number of splines 52 may be disposed on one side of the disc 37 from the opposite side so as to increase the friction forces on this side during a movement through the reflector 40 (not shown).

Figure 17A:
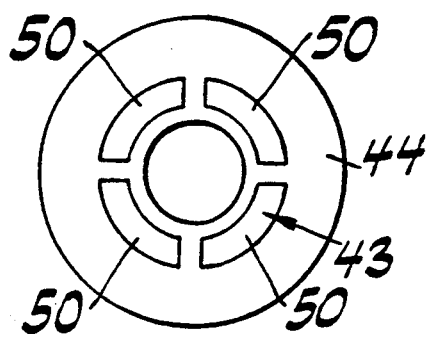
FIGS. 17A–17D illustrate views of the lens and cover during discharge of a battery constructed in accordance with the embodiment of FIG. 6.
Figure 17B:
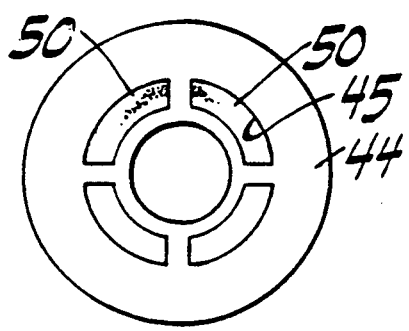
Figure 17C:
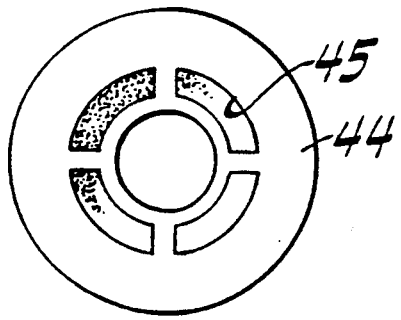
Figure 17D:
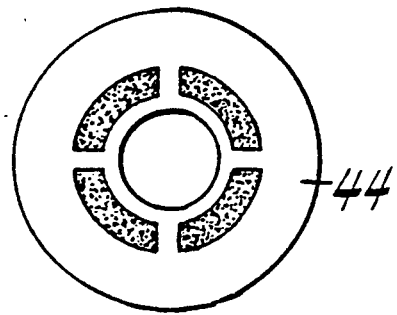

In this embodiment, as the disc 37 moves upwardly, the band of color 39 located on the peripheral 38 is viewed through only one or some of the apertures 45 of the cover 44. To this end, reference is made to FIGS. 17A–D. Thus, during the upwardly movement of the piston 37, color begins to appear in two of the apertures 45 (FIG. 17B). Continued upward movement causes more of the color to be viewed through the lens sections 50 and cover apertures 45 as indicated in FIG. 17C until finally all of the apertures 45 are completely filled with color. In this respect, the image of the band of color 39 develops in an analog circular manner about the lens 43. This analog circular movement indicates the state of charge from fully charged (FIG. 17A) to totally discharged (FIG. 17D) and all points in between.

Figure 11:
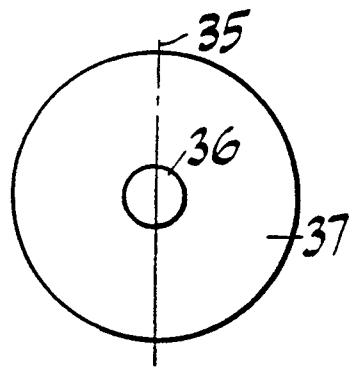
FIG. 11 illustrates a plan view of a modified piston assembly in accordance with the invention.
Figure 12:
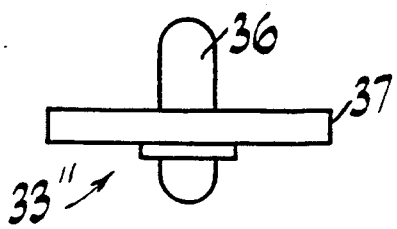
FIG. 12 illustrates a side view of the piston assembly of FIG. 11.

Referring to FIGS. 11 and 12, in another embodiment, the piston assembly 33" is provided with a peripheral wall which is of varying length, i.e. thickness. Alternatively, the disc 37 may be angled relative to the guide pin 36.

Figure 13:
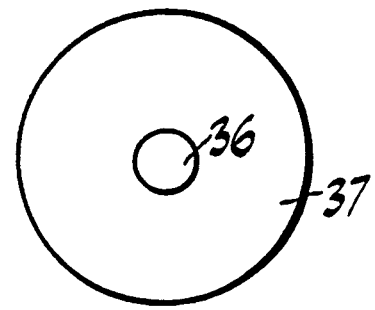
FIG. 13 illustrates a plan view of a further modified piston assembly according to the invention.
Figure 14:
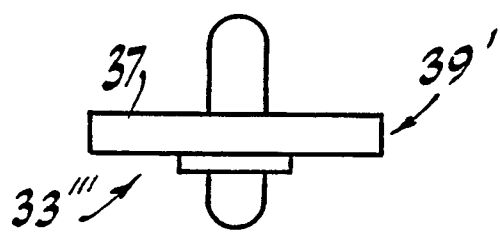
FIG. 14 illustrates a side view of the piston assembly of FIG. 13.

Referring to FIGS. 13 and 14, wherein like reference characters indicate like parts as above, the disc 37 of the piston assembly 33'" may be provided with a band 39' which of non-uniform width about the peripheral wall of the disc 37.

Figure 15:
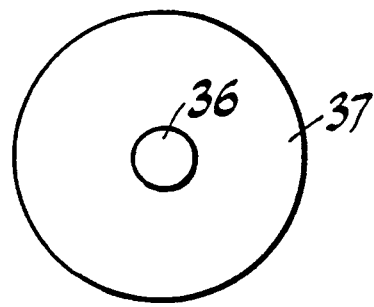
FIG. 15 illustrates a plan view of a still further modified piston assembly in accordance with the invention.
Figure 16:
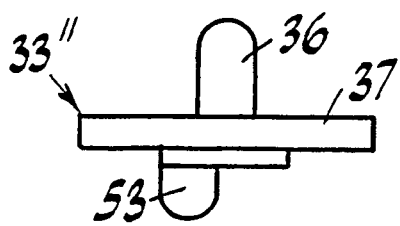
FIG. 16 illustrates a side view of the piston assembly of FIG. 15.

Referring to FIGS. 15 and 16, wherein like reference characters indicate like parts as above, the piston assembly 33 may have a guide pin 36 with a foot 53 which is eccentric of the housing axis so as to cause tilting of the disc 37 during an upward movement as described above.

Figure 18A:
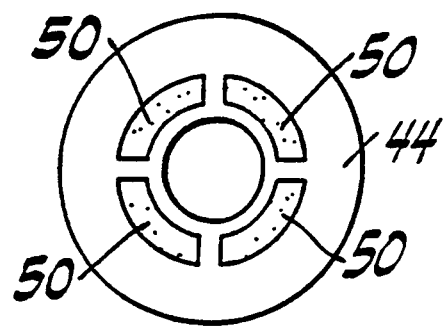
FIGS. 18A–18D illustrate views of the lens and cover of a modified embodiment of a battery constructed in accordance with FIG. 6.
Figure 18B:
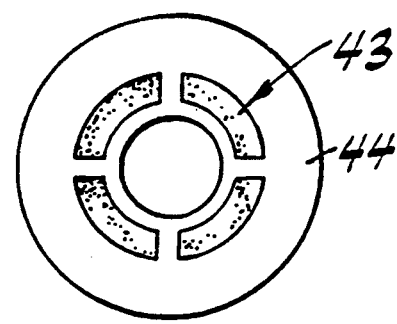
Figure 18C:
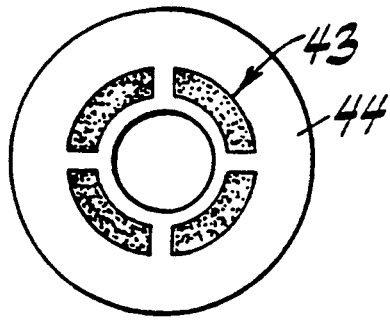
Figure 18D:
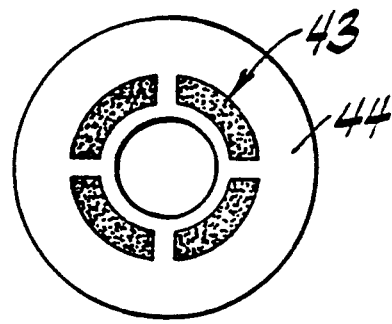

Referring to FIGS. 18A–18D, in an alternative embodiment, the peripheral wall of the disc amy be provided with a plurality of bands of different colors from each other (in this case, the appearance of color through the lens 43 will change during discharge). For example, in the fully charged state as shown in FIG. 18A, all of the lens sections 50 appear with the same color. As the battery discharges, as indicated in FIGS. 18B and 18C, the entire lens 43 shifts to different colors sequentially. When completely discharged, the final color is reached as indicated in FIG. 18D. In this embodiment, a color guide may be placed on the outside of the housing to indicater the amount of charge remaining.

The invention thus provides a battery charge indicator which can be permanently incorporated into a primary battery such as an alkaline battery. Further, the invention provides a battery charge indicator which is capable of providing state of charge information of a primary battery without a need for a switch or activator. Further, the indicator can be installed as a permanent part of a battery without causing any drain or reduction in performance of the battery.

The charge indicator can be installed in a battery without changing any of the outside dimensions of a standard primary battery and without changing the standard contact formats of a standard primary battery.

What is claimed is:

1. In combination,
    an alkaline battery including a housing having a closed end wall and a deformable end wall, an internally contained chemical cathode in said housing and an internally contained anode for generating an electrical current with said cathode while causing said cathode to expand against said deformable end wall;
    first means in contact with said deformable end wall for movement therewith; and
    second means for measuring the amount of movement of said first means to provide a visual indication of the remaining amount of expected expansion of said cathode.

2. The combination as set forth in claim 1 wherein said first means is a piston assembly aligned with a longitudinal axis of said housing.

3. The combination as set forth in claim 2 wherein said piston assembly includes a guide pin in contact with and extending longitudinally from said deformable end wall, and an annular disc mounted on said pin for movement therewith.

4. The combination as set forth in claim 3 wherein second includes a reflector having a central bore slidably receiving said disc of said piston assembly, a lens for viewing a reflection of a side face of said disc from said reflector, and a cover having at least one aperture overlying said lens for viewing said reflection.

5. The combination as set forth in claim 4 wherein said lens has a central bore slidably receiving said guide pin.

6. The combination as set forth in claim 4 wherein said disc has a flat peripheral wall, and said reflector is of annular shape to receive said disc with said peripheral wall recessed therein and with a reflective surface for reflecting an image of said peripheral wall during movement of said disc from within said reflector.

7. The combination as set forth in claim 6 wherein said lens is of annular shape and said cover has a plurality of circumferentially spaced apertures overlying said lens for viewing a reflection of said peripheral wall of said disc.

8. The combination as set forth in claim 7 wherein said peripheral wall has indicia to provide a visual reflected image corresponding the remaining amount of expected expansion of said cathode.

9. The combination as set forth in claim 8 wherein said indicia is a band of color.

10. The combination as set forth in claim 9 wherein said band is of non-uniform width about said peripheral wall.

11. The combination as set forth in claim 6 which further comprises a plurality of splines on said peripheral wall of said disc at uneven spacings and in contact with said reflector to impose a variable friction force on said disc to effect movement of said disc at an angle to said housing axis.

12. The combination as set forth in claim 6 wherein said peripheral wall of said disc is of varying length.

13. The combination as set forth in claim 3 wherein said guide pin has a face eccentric of said housing axis and in contact with said deformable end wall.

14. The combination as set forth in claim 8 wherein said indicia is a plurality of bands of color of different color from each other.

15. In combination,
    an alkaline battery including a housing having an internally contained chemical cathode and anode for generating an electrical current with said cathode expanding in an amount proportional to the total current generated;
    first means defining a compressible chamber within said housing and having an outlet therefrom, said chamber being exposed to said cathode for compression thereby in response to and expansion of said cathode, the first means including a elongated flexible tube disposed in the housing, the elongated flexible tube having a transverse cross-section,
    a vicous gel in said chamber for expelling through said outlet in proportional response to compression of said chamber; and
    second means defining a viewing channel in communication with said outlet to receive said gel expelled from said chamber.

16. The combination as set forth in claim 15 wherein the transverse cross-section of the flexible tube is an asymmetrical transverse cross-section.

* * * * *